United States Patent [19]
Strebel

[11] Patent Number: 5,830,392
[45] Date of Patent: Nov. 3, 1998

[54] COMPOSITIONS AND PROCESS FOR ROTATIONAL MOLDING ARTICLES

[75] Inventor: Jeffrey J. Strebel, Cincinnati, Ohio

[73] Assignee: Millennium Petrochemicals Inc., Cincinnati, Ohio

[21] Appl. No.: 72,348

[22] Filed: May 4, 1998

Related U.S. Application Data

[62] Division of Ser. No. 842,777, Apr. 17, 1997, Pat. No. 5,783,611.

[60] Provisional application No. 60/018,261 May 24, 1996.

[51] Int. Cl.⁶ .............................. B29C 5/04; B29C 5/12; B29D 27/00
[52] U.S. Cl. .................. 264/45.7; 264/45.3; 264/45.5; 264/126; 264/310; 521/51; 521/134
[58] Field of Search ................................. 264/45.5, 45.7, 264/45.3, 126, 310; 521/51, 134, 143

[56] References Cited

U.S. PATENT DOCUMENTS

| | | |
|---|---|---|
| 2,989,783 | 6/1961 | Slapnik . |
| 3,052,927 | 9/1962 | Hoppe et al. . |
| 3,814,778 | 6/1974 | Hosoda et al. . |
| 3,914,361 | 10/1975 | Shiina et al. . |
| 3,962,390 | 6/1976 | Mori et al. . |
| 3,976,811 | 8/1976 | DeTommasi . |
| 3,984,511 | 10/1976 | Lammers . |
| 4,533,696 | 8/1985 | Schrijver et al. . |
| 4,952,350 | 8/1990 | Duffy . |

*Primary Examiner*—Morton Foelak
*Attorney, Agent, or Firm*—Gerald A. Baracka; William A. Heidrich

[57] ABSTRACT

Improved compositions useful for the production of foamed rotomolded articles are provided. The compositions of the invention are comprised of a first thermoplastic resin component which is an ethylene polymer in pellet form containing a foaming agent and a second thermoplastic resin component which is a powder consisting of a mixture of different particle size and melt index ethylene polymers. An improved process for producing foamed rotomolded articles having uniformly foamed interiors and smooth exterior skins which are substantially free of surface defects is also provided.

18 Claims, No Drawings

COMPOSITIONS AND PROCESS FOR ROTATIONAL MOLDING ARTICLES

CROSS-REFERENCE TO RELATED APPLICATION

This application is a divisional of application Ser. No. 08/842,777 filed on Apr. 17, 1997, now U.S. Pat. No. 5,783,611.

This application claims the benefit of U.S. Provisional Application No. 60/018,261 filed May 24, 1996.

FIELD OF THE INVENTION

This invention relates to an improved process and compositions to produce rotationally molded articles having foamed interiors and non-foamed exterior skins which are smooth and substantially free of surface defects.

BACKGROUND OF THE INVENTION

Rotational molding, also commonly referred to as rotomolding, is widely used to produce hollow articles such as toys, sporting equipment, containers, water tanks, etc. For the process, a thermoplastic resin is placed in a mold which is then closed, heated and rotated on two axes, i.e., biaxially, to allow the resin to melt and uniformly coat the interior of the mold. The mold is then cooled and the molded article is removed. In many instances, it is highly desirable to have a foam layer or core in the interior of the molded article to provide insulation, impart structural integrity or stiffness to the article, reduce weight, or the like. This is accomplished by including a foaming or blowing agent with the resin which decomposes at the molding temperature to release a gas, such as $CO_2$ or $N_2$.

The use of foaming agents presents a problem where articles having a smooth exterior surface are desired and various techniques have been employed to produce foamed rotomolded goods having a smooth skin layer. In one approach, referred to as the "two-step" method, a non-foamable resin is first introduced into the mold and molded to produce a relatively thin non-foamed layer. The mold is then cooled and a foamable resin is introduced and the molding operation resumed so that a foamed layer is formed on the inside of the non-foamed layer. Such a method is disclosed in U.S. Pat. No. 3,976,821. While it is possible to produce acceptable molded goods in this manner by proper selection of resin(s) and operating conditions, the procedure is labor intensive and time-consuming. Also, it requires use of a mold with an opening to permit introduction of the foamable resin.

Another approach has been to utilize specially designed equipment, such as disclosed in U.S. Pat. No. 4,952,350, which permits both the non-foamable and foamable resin to be introduced at the beginning of the operation but maintained separately. In this way, the foamable resin can be released at some point in the operation after the non-foamable resin has melted and uniformly coated the interior surface of the mold.

In other cases, such as in U.S. Pat. No. 2,989,783, the foamable resin is enclosed in a thermoplastic bag. The foaming or expansion of the foamable resin forces the bag to conform to the shape of the mold and the bag then forms the outer surface of the article.

Still other approaches have been suggested to produce acceptable rotomolded goods having a smooth skin layer and foamed inner layer in a "one-step" process. These procedures include, for example, processes which rely on density differentials of the foamable and non-foamable resins. However, since density differences of most of the commonly used thermoplastic resins are slight, it is not possible to achieve sharp separation of the foamable and non-foamable layers using this approach.

Another method disclosed in U.S. Pat. No. 3,962,390 relies on the different heat capacities of the foamable and non-foamable resins. By using a resin having a greater heat capacity for the foamable resin, particles of the resin with the lower heat capacity begin to melt first and thereby coat the inner surface of the mold before the resin with the foam agent begins to melt.

While all of the above methods can produce foamed articles with an exterior surface of reasonable quality under optimum processing conditions, they are still prone to surface pitting, i.e., the presence of surface pores or pinholes. Surface pores, when sufficiently large and/or present in large numbers can severely detract from the appearance of the molded good and render the article unacceptable. Also, in other instances where the non-foamed skin resin is colored and the foamable interior resin particles is uncolored, surface blotches or blemishes are evident as a result of the interior foamed resin "pushing through" the skin layer. This is particularly true where a thin skin layer is desired and where, as is most usually the case, the foamable resin is in the form of pellets. Obviously, this latter problem could be overcome by coloring the foamable resin but this would increase the cost.

These and other disadvantages associated with heretofore known process are overcome by the composition and process of the present invention whereby it is possible to produce foamed rotomolded articles having an exterior skin which is smooth and substantially free of surface pitting and color blotches and a foamed interior layer.

SUMMARY OF THE INVENTION

In accordance with the present invention there is provided improved compositions useful for the production of rotomolded articles having foamed interiors and non-foamed exteriors comprising: (a) 25 to 75 percent by weight, based on the weight of the total composition, ethylene polymer pellets ranging in size from 1/16 inch to 3/16 inch in diameter and containing 0.25 to 7.5 weight percent chemical foaming agent, based on the weight of the ethylene polymer, said ethylene polymer having a melt index from 0.25 up to 25, and (b) 75 to 25 percent by weight, based on the weight of the total composition, ethylene polymer powder mixture containing: (i) a major proportion of fractional melt index ethylene polymer powder wherein 80 percent or more of the powder particles are greater than 250 microns in size and (ii) a minor proportion of ethylene polymer powder wherein 80 percent or more of the powder particles are less than 250 microns in size and the ethylene polymer has a melt index greater than 1 g/10 mins. The mean particle size of the two powder components, i.e., (b)(i) and (b)(ii) differ by at least 100 microns. The powder mixture most commonly consists of 75 to 97.5 percent (b)(i) preferably having a particle size from 250 to 1000 microns and 2.5 to 25 percent (b)(ii) preferably having a particle size from 10 to 250 microns. Azodicarbonamides and modified azodicarbonamides are the preferred foaming agents. Particularly useful results are obtained when (a) is high density polyethylene, (b)(i) is low density polyethylene and (b)(ii) is linear low density polyethylene.

There is also provided in an improved process utilizing said compositions wherein said polymer pellets containing the chemical foaming agent and said polymer powders are combined and heated in a mold at a temperature above the melt temperature of the polymers and above the decomposition temperature of the foaming agent while biaxially rotating the mold to produce foamed molded articles having smooth surfaces and which are subsequently free of surface defects such as pinholes and color blotches and a foamed interior are produced.

DETAILED DESCRIPTION OF THE INVENTION

The present invention relates to foamable polyolefin resin compositions and to foamed rotomolded articles produced therefrom having a non-foamed exterior skin. The articles may be hollow or the interior can be completely foam filled. The hollow articles may be flexible or have a rigid or semi-rigid structure depending on the resins employed and the relative thickness of the foamed and non-foamed layers.

The compositions of the invention are comprised of two distinct thermoplastic resin components, namely, a first component which is an ethylene polymer in pellet form and which has incorporated therein a chemical foaming agent and a second powder component which is a mixture of different particle size and melt index ethylene polymer powders.

Depending on the particular application involved, i.e., the rotomolded articles being produced, the weight ratio of pellet to powder may be varied within wide limits. In general, however, the first resin component, also referred to herein as the foamable resin or pelletized resin, constitutes from 25 to 75 weight percent of the total composition and the second powder resin component constitutes from 75 to 25 weight percent of the total composition. More preferably, the pelletized resin is present in an amount from 30 to 60 weight percent and the resin powder is present in an amount from 70 to 40 weight percent.

While any of the well-known polyolefin rotomolding resins can be used for the compositions of the invention, polyethylene resins are most generally employed for this purpose. As used herein the term "polyethylene" encompasses both homopolymers of ethylene and copolymers of ethylene with $C_{3-8}$ α-olefins where ethylene is the predominant monomer. These most commonly include polyethylenes, such as very low density polyethylene, low density polyethylene (LDPE), linear low density polyethylene (LLDPE and mLLDPE), medium density of polyethylene, high density polyethylene (HDPE) and very high density or ultra high molecular weight polyethylenes, produced using well-known polymerization catalysts and procedures. The foamable resin, i.e., first component, is a pelletized ethylene polymer having a melt index from 0.25 g/10 mins. up to about 25 g/10 mins. which contains from about 0.25 to 7.5 weight percent, based on the weight of the ethylene polymer, chemical foaming agent. The pellets range in size from about 1/16 inch to about 3/16 inch in diameter. In an especially useful embodiment, the ethylene polymer has a melt index from 1 to 10 g/10 mins. and contains from 0.5 to 5 weight percent chemical blowing agent.

It is particularly advantageous if the ethylene polymer is a high density polyethylene. HDPEs have densities in the range 0.941 g/cm³ to 0.970 g/cm³ and impart stiffness to the foamed interior layer or core of the rotomolded article. Also, HDPE has a higher melt temperature than lower density ethylene polymers which is desirable for optimal results with the process of the invention. Useful HDPE polymers include homopolymers of densities 0.960–0.970 g/cm³ and copolymers, usually with butene-1 or hexene-1, of densities 0.941–0.959 g/cm³. Densities reported herein for the ethylene polymers are determined in accordance with ASTM D-1505. Melt indexes referred to herein are determined in accordance with ASTM D-1238-57T at 2160 grams load and 190° C. Melt indexes are reported in g/10 mins.

Conventional chemical foaming agents are employed with the ethylene polymer and are incorporated utilizing known procedures. Typically, the polyethylene and chemical foaming agent are mixed in an extruder at a temperature above the melt temperature of the resin but below the decomposition temperature of the chemical blowing agent. The melt is then passed through suitable die, such as used with a pelletizer, to obtain the pelletized resin.

The foaming agents can be any of the known organic or inorganic compounds or systems which decompose at elevated temperatures to release a gas such as $N_2$ or $CO_2$. Organic foaming agents, sometimes also referred to as blowing agents, include azodicarbonamide and modified azodicarbonamide, i.e., azodicarbonamide modified with zinc oxide, calcium carbonate or the like to lower the decomposition temperature, 5-phenyltetrazole, dinitrosopentamethylene tetramine, azobisisobutyronitrile, diazoaminobenzene, oxybis(benzenesulfonylhydrazide) and the like. Inorganic foaming agents can include sodium borohydride, ammonium carbonate, sodium bicarbonate and modified sodium bicarbonate, i.e., sodium bicarbonate modified with a proton donor such as citric acid, and the like. Azodicarbonamide, modified azodicarbonamide, sodium bicarbonate and sodium bicarbonate/citric acid foaming agents are particularly useful for the compositions and process of this invention.

While it is not necessary, additives which function to control or modify foam cell size or foam density or modify/control the activator temperature or rate of decomposition of the chemical blowing agent may also be included with the ethylene polymer. Useful additives of this type include calcium carbonate, titanium dioxide, zinc oxide, talc, calcium stearate and the like. When present, the amount of these additives typically ranges from about 0.01 to about 1 percent by weight, based on the weight of the ethylene polymer.

To achieve the desired improvements with the composition and process of the invention, a second component referred to herein as the non-foamable component or powder component, which is a mixture comprised of two distinct ethylene polymer powders is necessarily used with the foamable resin. The ethylene polymer powders have different particle sizes and different melt indexes. The principal or primary powder component which comprises the major portion, i.e., greater than 50 percent, of the powder mixture is an ethylene polymer powder wherein 80 percent or more of the powder particles are 250 microns in size and wherein the ethylene polymer has a fractional melt index. As used herein, the term "fractional" melt index refers to melt indexes less than 1 g/10 mins. The minor powder component which constitutes less than 50 percent of the powder mixture is an ethylene polymer powder wherein 80 percent or more of the powder particles are less than 250 microns in size and wherein the ethylene polymer has a melt index greater than 1 g/10 mins. The mean particle size of the two powder components should differ by at least 100 microns. More typically, the mean particle size of the powder components which comprise the mixture will differ by 150 microns or more.

The particle size of the major powder component most generally ranges from 250 to 1000 microns and, more preferably, these powder particles range from 250 to 600 microns in size. The particle size of the minor powder component most generally ranges from 10 to 250 microns and, more preferably, these powder particles range from 20 to 225 microns in size. It will be understood for the above particle size ranges, as well as for other references to particle sizes herein, that 80 percent or more of the particles will fall within the specified size limits. Particle sizes are determined using standard screening procedures.

The larger particle size powder component most generally constitutes from about 75 to about 97.5 percent of the total powder mixture with the smaller particle size powder constituting from 2.5 to 25 weight percent. More preferably, the larger particle polymer comprise 85 to 95 weight percent of the powder mixture with the smaller particle size polymer comprising the balance.

In a highly useful embodiment of this invention the ethylene polymer comprising the major powder component and from which the larger size powder particles are derived has a melt index from 0.1 to 0.8 g/10 mins. and, more preferably, from 0.2 to 0.5 g/10 mins. In an especially useful embodiment the ethylene copolymer is a low density polyethylene, i.e., LDPE having a density from 0.915 to 0.930 g/cm$^3$. LDPEs are conventionally obtained by the high pressure homopolymerization of ethylene and characterized by having long chain branches which are formed during the polymerization. It is, however, also possible to utilize low density copolymers of ethylene with monomers which contain polar groups such as vinyl acetate, ethyl acrylate, n-butyl acrylate or the like.

The ethylene polymer which comprises the minor powder component and from which the smaller particle size powder particles are formed preferably has a melt index from 1 to 10 g/10 mins. and, most preferably, from 2 to 7 g/10 mins. It is especially useful if the ethylene polymer employed for this powder is a linear low density polyethylene, i.e., LLDPE, having a density from 0.915 to 0.940 g/cm$^3$. LLDPEs are conventionally obtained by polymerization of ethylene with butene-1, hexene-1 or octene-1.

In addition to the nucleating agents which can be included in the foamable ethylene polymer resin, other additives may also be present in small amounts with either the foamable and/or non-foamable resin. Such additives may include pigments and colorants, UV stabilizers, antioxidants, antistatic agents and the like. Typically, when present, these additives are used in amounts less than 1 percent and, more commonly, less then 0.5 percent by weight, based on the resin.

It is particularly useful when the foamable resin component is the highest melting resin in the composition. In this way, the non-foamable resin powders which form the exterior surface melt before the pellets containing the foaming agent and can uniformly coat the interior of the mold before significant foaming occurs. The resins employed for the non-foamable powder mixture may have different melt temperatures but it is not essential for the success of the process, since other factors such as particle size and the molding conditions also play a role.

In a preferred embodiment, where all of the resins employed have different peak melt temperatures (determined by differential scanning calorimetry) and where foamed rotomolded articles having superior surface quality are produced, the foamable resin is HDPE and the non-foamable powder is a mixture of 75 to 97.5 percent LDPE and 2.5 to 25 percent LLDPE. By utilizing these resins, and when all of the other specified criteria are met, it is possible to produce foamed articles having a smooth exterior appearance and which are substantially free of surface pores or pinholes. As used herein, the terms "essentially free" or "substantially free" indicate that while some pitting may be apparent on close examination, these pinholes or surface pores are of a nature and number so as not to render the surface of the molded article unacceptable, i.e., the overall appearance is not objectionable to the observer when viewed with the naked eye. Magnification of the surface may reveal some surface porosity, however, any surface pores present are sufficiently small in number and size that they do not detract from the surface appearance.

Additionally, when using a non-foamable resin powder which is colored, the skin layer of the rotomolded article is uniformly colored and free of color blotches. Color blotches, or "measling" as it is also known, caused by uncolored foamable resin pellets "pushing through" the skin layer during the rotation is virtually eliminated with the compositions and process of this invention.

With the present invention it is possible to produce foamed rotomolded parts in a one-step operation. The process eliminates the need of introducing the foamable and non-foamable resins into the mold in two steps and also overcomes problems associated with heretofore known one-step processes. In the present invention, the resin pellets containing the foaming agent and the non-foamable resin powder are both charged to the mold at the outset of the rotomolding operation. The pellets and powder may be added separately or they may be combined and the mixture charged to the mold. After the pellets and powder are introduced, the mold is closed and the rotomolding operation can be conducted without interruption.

For the molding process, the mold is rotated biaxially, i.e., in two directions, utilizing conventional rotomolding equipment. No special equipment is required to carry out the process. The powder and pellets are moved throughout the mold and contact the interior surfaces which enables the resins to melt and uniformly coat the interior of the mold. Interior surfaces of the mold may be treated with a suitable mold release agent, however, this is optional. The mold is rotated at a speed which permits the resin to contact the inner walls of the mold by action of gravity. Centrifugal forces are nonexistent or minimal. Typically, heating is accomplished by placing the mold in an oven. The temperature must be sufficient to melt the resins and activate the foaming agent and will generally range between about 200 ° to 350° C. The speed of rotation of the mold in the two directions can also be varied between wide limits. Generally, the rate of rotation will be between about 1 and about 25 rpm. In one embodiment of the invention it has been found to be particularly advantageous to operate at a higher rotation rate than is generally used in commercial practice. Whereas, ratios of 4:1 (outer axis:inner axis) are commonly employed for commercial rotomolding operations, with the compositions of this invention exceptional results have been observed when the outer axis rotation rate is from 12 to 25 rpm and the inner axis rotation rate is 7 to 20 rpm.

The temperature used for the rotomolding operation will depend on various factors including the size of the mold, mold geometry, thickness of the part being rotomolded, the foaming agent used and the resins employed. Similarly, the length of time required to rotomold the article will depend on these factors and the temperature. As a result, time and temperature will vary within wide limits. For example, to mold a tank having a part thickness of approximately 0.5 inch using a preferred composition of the invention wherein the foamable resin is HDPE and the non-foamable powder is a mixture of LDPE and LLDPE, a temperature in the range of about 225° C. to 300° C. is preferred for a time of 20 to 50 minutes.

These and other features of the invention are illustrated in more detail in the examples which follow. All parts and percentages in the examples are on a weight basis unless otherwise indicated.

EXAMPLE 1

A rotomolding composition comprising 40 percent foamable resin pellets and 60 percent non-foamable resin powder was prepared in accordance with the invention. The foamable resin was HDPE (MI 5.5; density 0.961) containing 0.6 percent azodicarbonamide obtained by pre-compounding the HDPE and foaming agent in an extruder and pelletizing. The non-foamable resin powder was a mixture of 90 percent LDPE (MI 0.25; density 0.918) and 10 percent LLDPE (MI 3.5; density 0.939) powders of different particle size obtained by grinding. Particle size distributions of the two powders (determined by shaking a known amount of powder through a stack of screens of different mesh size and measuring the amount of material retained) were as follows:

|                    | LDPE Powder | LLDPE Powder |
|--------------------|-------------|--------------|
| >590 microns       | 0%          | 0%           |
| 500–590 microns    | 8.6%        | 0%           |
| 420–449 microns    | 44.3%       | 0%           |
| 250–419 microns    | 29.4%       | 1.8%         |
| 180–249 microns    | 9.7%        | 44.9%        |
| 150–179 microns    | 3.6%        | 19.1%        |
| <150 microns       | 4.4%        | 34.2%        |
| Mean Particle Size | 370         | 185          |

To facilitate visual examination and comparison of rotomolded parts produced from the rotomolding composition, 1.5 percent inorganic red pigment (DC-22552 RED from Teknor Color Company) was melt blended with the LLDPE resin before grinding.

Approximately 7½ pounds of the powder/pellet mixture was introduced into an aluminum tank mold measuring 13×20×3 inches vented with a Teflon® tube containing a steel wool plug. The rotomolding operation was carried out using a single arm shuttle rotomolding machine and the following conditions:

| Temperature    | 250° C.                  |
|----------------|--------------------------|
| Time           | 45 minutes               |
| Rotation Rate: |                          |
| Outer Axis     | 19 rpm                   |
| Inner Axis     | 15 rpm                   |
| Cooling Cycle: | 10 minutes air (with fan)|
|                | 10 minutes water spray   |
|                | 10 minutes air (with fan)|

The rotomolded tank had good rigidity and mechanical strength. The exterior skin was smooth and substantially free of surface pitting. Furthermore, the skin layer was uniformly colored with no indication of the uncolored interior foam layer pushing through the surface layer. Sectioning the tank revealed a sharp boundary between the foam and skin layers and uniform thickness of the layers throughout the entire part. Furthermore, the foam layer had uniform cell structure with a smooth, continuous interior surface.

Comparison A

To demonstrate the necessity of using a mixture of powders, when Example 1 is repeated except that the non-foamable resin powder is comprised solely of either (a) 100 percent of the fractional melt index LDPE powder or (b) 100 percent of the 3.5 MI LLDPE powder, it is not possible to produce articles having good layer distinction and a non-pitted exterior surface. In the first case (a), where the higher MI, smaller particle size LLDPE powder is omitted, the skin layer of the tank is heavily pitted and unacceptable. In the second case (b), where the fractional melt index, larger particle size LDPE powder is omitted, the surface is smooth but "measled," i.e., uncolored or lightly colored blotches are evident on the surface as a result of uncolored foaming resin mixing with the colored skin layer.

Comparison B

To demonstrate the need for the major, larger particle size powder component to have a fractional melt index, Example 1 was repeated except that different LDPE resins were employed in the makeup of the powder mixture. In the first instance, the LDPE was a 2.1 MI, 0.922 density resin and in the second instance, the LDPE had an MI of 3.7 and density of 0.923. The powder particle size distribution was essentially the same as for the fractional melt index LDPE of Example 1. While rotomolded tanks produced using the two comparative resins were smooth and essentially free of pitting, numerous light colored areas or blotches where the uncolored foamed resin mixed with the colored skin layer were apparent. In the case of the 2.1 MI LDPE, there were 0.15 blemishes per square inch of surface whereas 0.21 blemishes per square inch were recorded with the 3.7 MI LDPE. Furthermore, the thickness of the foam layer was not uniform in either case and, with the 3.7 MI resin, there was incomplete foam coverage.

EXAMPLE 2

To further illustrate the invention and the ability to rotomold foam-filled parts having a smooth, uniformly colored, pit-free exterior skin, a composition comprised of 50 percent pellets and 50 percent powder was prepared and evaluated. For this experiment the HDPE pellets contained 1.5 percent azodicarbonamide and the HDPE had an MI of 4.0 and density of 0.946. The powder was the same LDPE/LLDPE mixture as used for Example 1. Rotomolding was conducted as previously described except that the venting system was modified and the cooling cycle was as follows:

20 minutes air
20 minutes air (with fan)
10 minutes water spray
10 minutes air (with fan)

A molded tank produced using the above-described composition had a smooth skin layer and the interior was completely foamed. The surface was substantially free of pinholes and no color variation was observed.

EXAMPLE 3

To further demonstrate the need for the smaller particle size powder component and the effect of particle size, a series of rotomolding compositions were prepared containing 50 percent HDPE pellets and 50 percent of a mixture of LDPE and LLDPE powders. The HDPE component had an MI of 8 and density of 0.963 and the pellets contained 0.6 percent azodicarbonamide. The LDPE (MI 0.25; density 0.922) powder used for all the products had essentially the same particle size distribution as in Example 1; however, the LLDPE (MI 3.5; density 0.939) particle size distribution was varied. Details of the compositions and particle size distributions of the various LLDPE powders used are set forth in the table which follows. Compositions 3(a) and 3(b) are products of the invention whereas compositions C, D, E and F are provided for comparative purposes.

Each composition was used to rotomold a foamed hexagonal article and the surface porosity evaluated. For the rotomolding operation, 2.4 lbs of the composition was charged to a steel hexagonal mold measuring 12 inches across and 5 inches deep. The mold was heated at 350° C. for 25 minutes while rotating at a rate of 9 rpm (inner axis) and 16 rpm (outer axis). The cooling cycle consisted of 10 minutes water spray and 10 minutes air cooling with a fan. The number of surface pores or pinholes in a 1.2 cm×1 cm area was measured using the Global Lab Image Analysis "Particle" Tool/Function. The image was generated by a camera attached to a stereomicroscope (15 X magnification). The measurement area was held constant by maintaining the scanning region borders at their outer limits. Two areas at the approximate same location on each of the articles were examined and the number of surface pores determined by averaging eight readings (four readings in each area). Results are reported in the table. The data clearly show the significant and unexpected reduction in the number of pinholes with the compositions of the invention when the minor powder component has a particle size less than 250 microns. As the particle size of the minor (LLDPE) component in the powder mixture is increased, there is a marked increase in the number of surface pits on the rotomolded part.

employed for Example 1. Tanks of comparable quality were produced using shorter cycle times which results in significant cost benefits. By the addition of ZnO to the foamable resin pellets, it was possible to reduce the cycle time by approximately 15 percent without sacrificing foam or surface qualities of the rotomolded part.

I claim:

1. In a one-step process for rotational molding articles having a foamed interior and non-foamed exterior skin wherein a molding composition comprised of neat polymer particles and polymer particles containing a chemical foaming agent are combined and heated in a mold at a temperature above the melt temperature of the polymers and above the decomposition temperature of the foaming agent while biaxially rotating the mold, to produce an article which is uniformly foamed with an exterior skin which is smooth and substantially free of surface defects, the improvement wherein the molding composition comprises:

(a) 25 to 75 percent by weight, based on the weight of the total composition, ethylene polymer pellets ranging in size from $\frac{1}{16}$ inch to $\frac{3}{16}$ inch in diameter and containing 0.25 to 7.5 weight percent chemical foaming agent, based on the weight of the ethylene polymer, said ethylene polymer having a melt index from 0.25 g/10 mins. up to 25 g/10 mins., and (b) 75 to 25 percent by weight, based on the weight of the total composition, ethylene polymer powder containing:

(i) a major proportion of fractional melt index ethylene polymer powder wherein 80 percent or more of the powder particles are greater than 250 microns in size and

| PRODUCT | 3(a) | 3(b) | C | D | E | F |
|---|---|---|---|---|---|---|
| Powder Composition: | | | | | | |
| % LDPE | 90 | 85 | 90 | 85 | 90 | 85 |
| % LLDPE | 10 | 15 | 10 | 15 | 10 | 15 |
| LLDPE Particle Size (microns) | <250 | <250 | 250–297 | 250–297 | 420–590 | 420–590 |
| Average number of surface pits | 10 | 6 | 121 | 67 | 188 | 176 |

EXAMPLE 4

Example 3(a) was repeated except that a LDPE (MI 1.8; density 0.923) containing 0.6 percent azodicarbonamide was employed as the foamable resin. Rotomolded hexagonal articles produced therefrom had a smooth, uniformly colored skin layer.

EXAMPLE 5

Repeating Example 4 but substituting a fractional melt index HDPE powder for the LDPE powder also gave foamed rotomolded articles with exterior skins which were smooth and substantially free of surface pitting.

EXAMPLE 6

To demonstrate the ability to include additives in the foamable resin, a rotomolding composition was prepared by combining the following:

| 3.80 parts | HDPE pellets (MI 4.3; density 0.953) containing 0.5 wt. % zinc oxide and 1.8 wt. % azodicarbonamide |
| 0.41 parts | LLDPE powder of Example 1 |
| 3.97 parts | LDPE powder of Example 1 |

The above composition was used to rotomold a tank using the same mold, resin charge, temperature and rotation rate (ii) a minor proportion of ethylene polymer powder wherein 80 percent or more of the powder particles are less than 250 microns in size and the ethylene polymer has a melt index greater than 1 g/10 mins., and with the proviso that the mean particle size of (b)(i) and (b)(ii) differ by at least 100 microns.

2. The process of claim 1 wherein (a) comprises from 30 to 60 weight percent of the total composition and (b) comprises from 40 to 70 weight percent of the total composition.

3. The process of claim 1 wherein the foaming agent is selected from the group consisting of azodicarbonamide, modified azodicarbonamide, sodium bicarbonate and sodium bicarbonate/citric acid.

4. The process of claim 3 wherein the foaming agent is present in an amount from 0.5 to 5 weight percent based on the weight of the ethylene polymer.

5. The process of claim 4 wherein the foaming agent is azodicarbonamide or modified azodicarbonamide.

6. The process of claim 1 wherein (a) is a high density ethylene homopolymer or copolymer of ethylene and $C_{3-8}$ α-olefin having a melt index from 1 to 10 g/10 mins.

7. The process of claim 6 wherein (a) has a density from 0.941 to 0.970 g/cm$^3$.

8. The process of claim 7 wherein (a) is a copolymer of ethylene with butene-1 or hexene-1 having a density of 0.941 to 0.959 g/cm$^3$.

9. The process of claim 1 wherein (a) also contains 0.01 to 1 weight percent, based on the weight of the ethylene polymer, of an additive selected from the group consisting of calcium carbonate, zinc oxide, talc and calcium stearate.

10. The process of claim 1 wherein (b)(i) constitutes from 75 to 97.5 percent of the total powder mixture and (b)(ii) constitutes from 2.5 to 25 percent of the total powder mixture.

11. The process of claim 10 wherein (b)(i) has a particle size form 250 to 1000 microns and is a low density ethylene homopolymer having a melt index from 0.1 to 0.8 g/10 mins.

12. The process of claim 11 wherein (b)(i) is a low density polyethylene having a density from 0.915 to 0.930 g/cm$^3$.

13. The process of claim 12 wherein (b)(i) has a particle size from 250 to 600 microns and a melt index from 0.2 to 0.5 g/10 mins.

14. The process of claim 10 wherein (b)(ii) has a particle size from 10 to 250 microns and is a low density copolymer of ethylene with butene-1, hexene-1 or octene-1 having a melt index from 1 to 10 g/10 mins.

15. The process of claim 14 wherein (b)(ii) is a linear low density polyethylene having a density from 0.915 to 0.940 g/cm$^3$.

16. The process of claim 15 wherein (b)(ii) has a particle size from 20 to 225 microns and a melt index from 2 to 7 g/10 mins.

17. The process of claim 1 conducted at a temperature from 200° C. to 350° C. with a rate of rotation about the outer axis of 12 to 25 rpm and rate of rotation about the inner axis of 7 to 20 rpm.

18. The process of claim 1 wherein (a) comprises from 30 to 60 weight percent, based on the weight of the total composition, high density copolymer of ethylene and butene-1 or hexene-1 having a density from 0.941 to 0.959 g/cm$^3$ and a melt index from 1 to 10 and containing from 0.5 to 5 weight percent, based on the weight of the high density copolymer, of a foaming agent selected from the group consisting of azodicarbonamide and modified azodicarbonamide and (b) comprises from 40 to 70 weight percent based on the weight of the total composition, ethylene polymer powder mixture containing from 75 to 97.5 weight percent, based on the total powder mixture, low density polyethylene powder having a density from 0.915 to 0.930 g/cm$^3$, melt index from 0.2 to 0.5 g/10 mins. and particle size from 250 to 1000 microns and 2.5 to 25 weight percent, based on the total powder mixture, linear low density polyethylene powder having a density from 0.915 to 0.940 g/cm$^3$, melt index from 2 to 7 g/10 mins. and particle size from 10 to 250 microns.

* * * * *